Aug. 19, 1924.
N. G. HOVLID
1,505,643
LIQUID BRAKE FOR AUTOMOBILES
Filed June 6, 1922
2 Sheets-Sheet 2
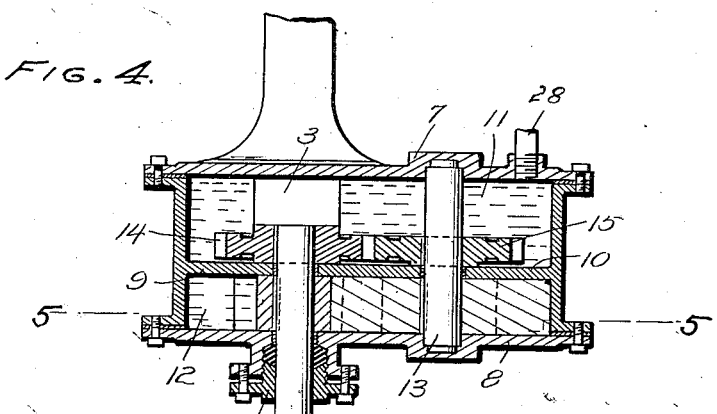
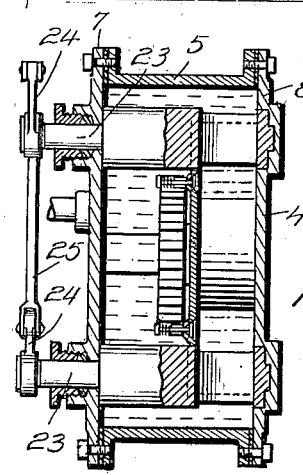
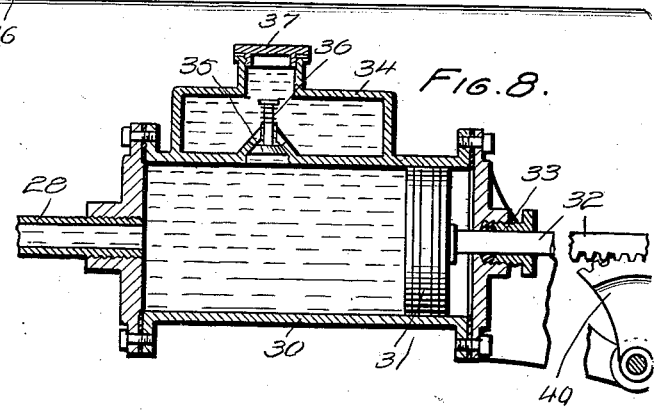
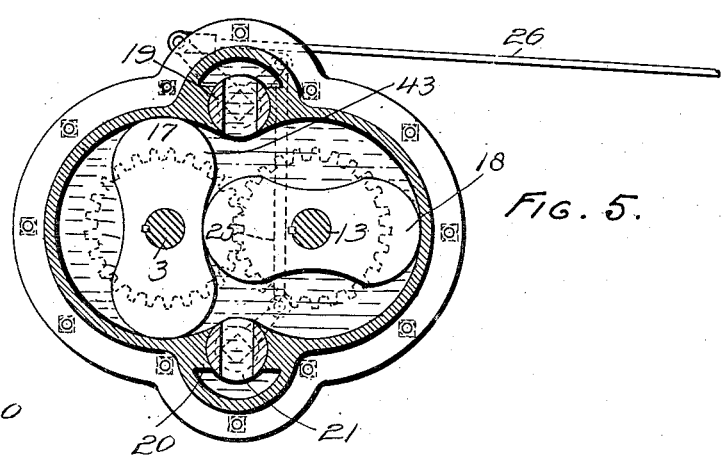
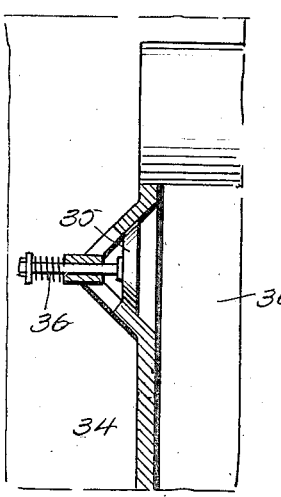
NORMAN G. HOVLID
INVENTOR.
BY Geo. I. Kimmel
ATTORNEY.

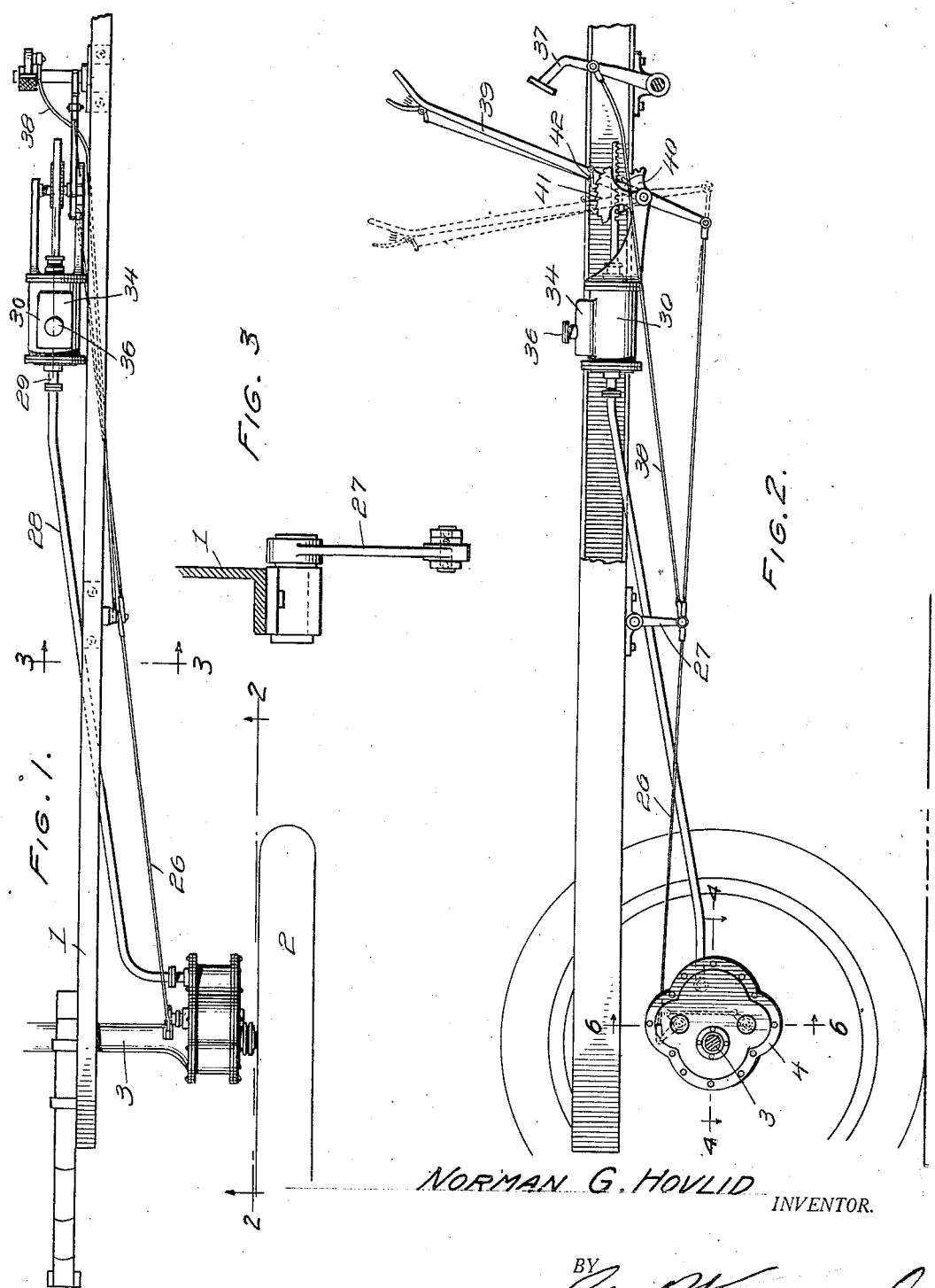

Patented Aug. 19, 1924.

1,505,643

UNITED STATES PATENT OFFICE.

NORMAN G. HOVLID, OF LONGMONT, COLORADO.

LIQUID BRAKE FOR AUTOMOBILES.

Application filed June 6, 1922. Serial No. 566,439.

*To all whom it may concern:*

Be it known that I, NORMAN G. HOVLID, a citizen of the United States, residing at Longmont, in the county of Boulder and State of Colorado, have invented certain new and useful Improvements in Liquid Brakes for Automobiles, of which the following is a specification.

This invention has reference to improvements in liquid brakes for automobiles and its object is to utilize a noncompressible substance for the application of the braking forces thus rendering the brake apparatus highly efficient and readily adaptable for the purposes for which it is intended.

In accordance with the invention, there is provided a rotary pump of the epicyclic type with valves by which the volume of liquid employed may be regulated, said valves being connected by suitable ducts in turn connected to the foot pedal and the emergency brake lever of the liquid brake with either of the operating means so connected that each may be used without the other.

The invention will be best understood from a consideration of the following detailed description taken in connection with the accompanying drawings forming a part of this specification, with the understanding that the invention is not confined to any strict conformity with the showing of the drawings, but may be changed and modified so long as such changes and modifications mark no material departure from the salient features of the invention as expressed in the appended claims.

In the drawings:

Figure 1 is a plan view of the brake structure.

Fig. 2 is a section on the line 2—2 of Fig. 1.

Fig. 3 is a section on the line 3—3 of Fig. 1.

Fig. 4 is a section on the line 4—4 of Fig. 2.

Fig. 5 is a section on the line 5—5 of Fig. 4.

Fig. 6 is a section on the line 6—6 of of Fig. 2.

Fig. 7 is a detailed section of one of the intake valves.

Fig. 8 is a longitudinal section through the pump cylinder.

Referring to the drawings there is shown a portion 1 of the chassis of an automobile, a rear wheel 2 and a rear axle 3, upon which latter there is mounted a pump cylinder 4 of the epicyclic type. The cylinder of the epicyclic pump 4 comprises an appropriately shaped pump cylinder 5 shown in Figs. 4, 5 and 6, with heads 7, 8 at opposite ends and divided between the ends by means of a diaphragm 10, through which the axle 3 extends. The diaphragm 10 divides the interior of the pump casing into two chambers 11, 12 and the axle 3 and a stub shaft 13 where located in the chamber 11 has intermeshing gears 14, 15 keyed thereto so as to rotate simultaneously.

Where the axle 3 extends through the chamber 12 and head 8, there is provided a packing gland 16 to prevent any escape of liquid from such point.

Within the chamber 12 and fast to the axle 3 and stub shaft 13 are rotary pump pistons 17, 18, respectively, these pistons intermeshing and constructed to operate after the manner of epicyclic pumps.

At the intersecting points of the chambers containing the pistons 17 and 18 there are located rotary valves 19 and 20, each with a passage or port 21 therethrough, each valve being mounted to rock about an axis 23 to which is secured a crank 24 and the two cranks are connected by a link 25 whereby the valves may be rocked simultaneously by another link 26, leading to a rock arm 27 mounted on the chassis 1.

Entering the casing of the pump 5 is a pipe 28 communicating with an outlet 29 at one end of a reciprocatory pump 30 mounted on the chassis or other suitable part of the automobile.

The pump 30 has a reciprocatory piston 31 therein, carried by a reciprocatory piston rod 32 (see Fig. 8). The piston rod 32 extends through a packing gland 33 at the end of the pump 30 remote from the pipe 28, and the pump 30 has a chamber 34 formed thereon. The chamber 34 is in communication with the pump 30 by way of a one-way valve 35 held by a spring 36 in a one-way closed position. The chamber 34 is furnished with a screw cap 37' by which oil or other like substance may be introduced into the chamber 34 as needed.

The brake device of this invention is furnished with a foot lever 37 connected by a rod 38 to the rod 26 by way of the rocker arm 27, and there is also provided a hand lever 39 similar to the ordinary emergency brake lever of automobiles.

The lever 39 is fastened to a gear segment 40 engaging the rack bar 32 so that as the lever 39 is reciprocated in one direction, the piston 31 is moved lengthwise in the cylinder 30, forcing liquid from within the cylinder 30 through the pipe 28 into the intake of the pump 4 thereby causing the pistons 17 and 18 to rotate or to retard the rotation of such pistons as the case may be, and the speed of rotation of the pistons 17 and 18 is governed by the valves 19 and 20 with respect to their adjustments by the lever 37 or the lever 39 as the case may be.

Fast to the frame of the pump 30 is a ratchet segment 41, and associated with such segment is a pawl 42 movable thereover so that the lever 39 may be adjusted in different positions with respect to its arc of movement about the axis of the gear segment 40 which segment participates in the movements of the lever 39.

In operation, one piston of the pump is keyed to the rear axle shaft which passes through it and the other piston is keyed to the first piston so that they both rotate at the same speed. When the parts are in inoperative position so far as the braking action is concerned, the pump rotary pistons 17 and 18 are free to rotate, which rotation is simultaneous so far as the pistons are concerned. At the same time, if the valves 19 and 20 be in the open position, fluid will be pumped in through one valve, say the valve 19 and out through the other valve, say the valve 20. Under these circumstances, braking is not performed.

If, now, either the foot brake lever 37 or the hand lever 39 be manipulated, the valves 19 and 20 are simultaneously moved toward or to the closed position, whereby the flow of liquid, which may be oil, is more or less throttled or completely prevented. If the flow of oil be stopped, there is no escape for the oil, and such oil being practically incompressible, the braking is complete. If the closure of the valves 19 and 20 be incomplete, there is simply an increased resistance to the flow of the oil and such flow is correspondingly throttled.

When the hand brake lever 39 is moved, the piston 31 is actuated, and by means of the gear segment 40, moves the piston 31 to force oil from the cylinder 30 by way of the pipe 28 to the chamber 11 retarding the rotation of the epicyclic pump to a commensurate extent.

When the vehicle is moving, the degree of resistance offered to the rotation of the pump pistons represents the amount of braking. When the vehicle is standing still, the pump having no back pressure therein does not retard the mechanism, wherefore outside pressure must be brought to bear to prevent the vehicle from moving. This is done by means of the hand lever 39 which is brought to a position first closing the valves 19 and 20 tightly and the piston 31 being moved back in the cylinder of the pump, forces the oil out through the pipe 28 into the brake chamber 11, producing considerable pressure which is felt in the pump chamber 12 through the automatic valves 19—20. As soon as the brake lever 39, which acts as an emergency brake is pushed forward, the valves open, the emergency brake pump draws oil from the brake into the cylinder and relieves the pressure from the brake and allows the wheels to move. As soon as the piston of the emergency brake pump moves past the center of the cylinder where the one-way valve 35 is located, oil may be drawn from the reservoir 34 on top of the cylinder through the one-way valve 35 thus keeping the brake and the pump cylinder full of oil.

The invention has numerous advantages in presenting little wear, the parts running in a bath of oil. It is also noiseless because everything is inclosed and there is neither screeching nor chattering. The device is very simple, only four working parts in each brake.

Moreover, the brake is positive since it needs to turn but one half of a revolution to said brake when the valves are entirely closed.

The brake is very easy to operate since but very slight pressure is needed on foot pedal to rotate the valve.

The brake is self-adjusting for every time the emergency brake is set, oil flows in from the reservoir to replenish any loss.

The invention is clean to attend to for it is only necessary to unscrew the top cap 37' of the reservoir to fill the latter. There is no muss, only half the bother of the ordinary brake and it may be tended to while the driver has on good clothes.

What is claimed is:—

1. In a brake mechanism for automobiles, an epicyclic rotor fastened to the rear axle of the automobile to rotate therewith, a reciprocatory pump, means for manually operating the said pump, and a conduit connecting the pump to the rotor, whereby the rotor may be caused to retard or stop the rear axle through the epicyclic rotor.

2. In a brake mechanism for automobiles, a rotor fastened to the rear axle of the automobile to rotate therewith, valves for the rotor to control the admission of liquid thereto, a pump connected to the rotor to supply liquid to said rotor, and manually operable means for controlling the valves.

3. In a brake mechanism for automobiles, a rotor fastened to the rear axle of the automobile to rotate therewith, valves for the rotor, a reciprocatory pump connected to the rotor, and manually operable means for controlling the valves to open or throttle them at will.

4. In a brake mechanism for automobiles, a rotor fastened to the rear axle of the automobile to rotate therewith, valves for the rotor, a reciprocatory pump connected to the rotor, and manually operable means for controlling the valves to open or throttle them at will, said manually operable means comprising a foot lever and a hand lever independently connected to the valves for controlling them separately and subject to separate manipulation.

5. In a brake mechanism for automobiles, a rotor fastened to the rear axle of the automobile to rotate therewith, valves for the rotor, a reciprocatory pump connected to the rotor, and manually operable means for controlling the valves to open or throttle them at will, said manually operable means comprising a foot lever and a hand lever independently connected to the valves for controlling them separately and subject to separate manipulation, the reciprocatory pump being provided with a supply chamber for liquid, a duct connecting the pump to the rotor, and a one-way valve between the supply chamber and the pump.

In testimony whereof, I affix my signature hereto.

NORMAN G. HOVLID.